June 21, 1949.　　　　　C. P. MOLYNEUX　　　　　2,474,009
OIL FILTER AND PUMP COMBINATION
Filed June 2, 1948

INVENTOR
Cecil P. Molyneux
BY
Pennie, Edmonds, Morton and Barrows
ATTORNEYS

Patented June 21, 1949

2,474,009

UNITED STATES PATENT OFFICE 2,474,009

OIL FILTER AND PUMP COMBINATION

Cecil Patrick Molyneux, Hampton Bays, N. Y., assignor to Filtors, Incorporated, Long Island City, N. Y., a corporation of New York Application June 2, 1948, Serial No. 30,649

6 Claims. (Cl. 103—202)

My invention relates to improvements in oil filtering apparatus associated with internal combustion engines, and more particularly to a combined oil pump and oil filter which cooperate with each other to produce an improved and controlled filtering operation.

The problem of providing oil filtering apparatus for internal combustion engines equipped with certain types of oil pumps is of considerable importance because of the advantages which may be obtained by combining the pump and filter in a unit, or of providing a filter which is adapted to be used in connection with a particular type of pump.

Proposals have previously been made for the mounting of an oil filter directly onto a gear type oil pump. In such proposals provision has been made for a filter inlet duct which communicates with the outlet chamber of the gears and a filter outlet duct which communicates with the chamber at the inlet side of the gears. One difficulty with such installations is that there is apparently no effective way of controlling the proportion of oil passed through the filter in relation to that delivered to the bearings of the engine when the pump is operated. Such control is extremely difficult because the inlet and outlet lines of the filter are continuously in open communication with the outlet and inlet chambers, respectively, of the gear pump. In a known instance where a propoasl was made to mount a filter on a gear pump, even by an important automotive concern, it was not adopted in commercial practice.

Some automotive engines are provided with filters and some are not, but in most all cases the filter unit is simply mounted on the body of the engine by a bracket and the inlet line from the filter connected by an exposed pipe to an outlet line for the engine pump. In such cases the outlet line from the filter is also connected by an exposed pipe so that it discharges into the engine crank case. Such exposed lines are a disadvantage in that they may become loose or broken so that oil is lost from the engine, sometimes under inconvenient circumstances.

The present invention is primarily concerned with the combination of an oil filter with a pump of the eccentric or vane type. With such a pump the cover plate is removed and the filter attached in place thereof, and according to the invention the inlet and outlet ducts from the filter are positioned so that they open at the face of the pump so that each is alternately opened and closed to a controlled extent during the functioning of the pump.

In my pending application, Serial No. 15,545, filed March 18, 1948, I have disclosed certain features, relationships and structures of my present invention. My application therefore is a continuation-in-part of said pending application.

My invention includes other features, objects and advantages, all of which will be described in detail hereinafter in connection with the apparatus shown in the accompanying drawings and constituting an illustrative embodiment thereof.

Figure 1:
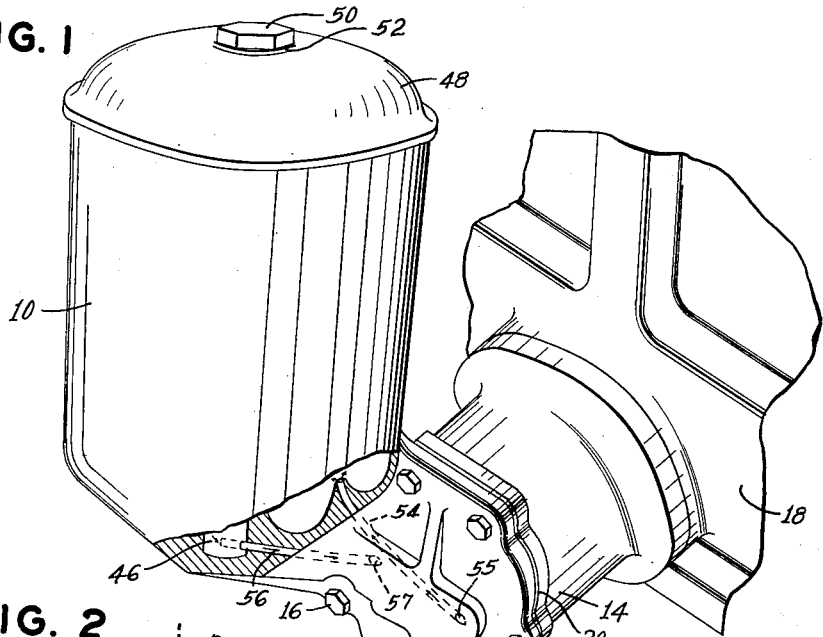
Fig. 1 is a perspective view partly in section, with parts broken away, of a combined filter and pump constructed and arranged in accordance with my invention.

Referring to Fig. 1 of the drawings, the improved oil filter unit includes a substantially cylindrical shaped cast aluminum filter body 10 having an integral cast flange or mounting plate 12 and a pump body 14 to which the flange or plate 12 is secured by studs or bolts 16. The pump body 14 projects from and is an integral part of, or secured to, an engine body 18. The type of pump 14 shown in the drawings and secured to the engine body approximately in the manner shown, is conventional with certain makes of automobile engines, as for example, the engines for Dodge and Plymouth automobiles. The plate 12 is secured to the face of the pump body 14 and made fluid-tight thereto by means of a gasket 20.

Under present circumstances, the automobiles of the type referred to are not provided with filters at the factory, and the face of the pump as illustrated, is covered over with a cover plate which is very similar in appearance to the plate or flange 12. The removal of the cover plate exposes the face of the pump mechanism shown in Fig. 2, which comprises a freely rotatable ring 22 which fits in a circular pocket 24 in the body of the pump and which has an internal contour, as illustrated, forming five pockets 26, alternating with, or formed by, a corresponding number of inwardly projecting arced segments 28.

The ring 22 cooperates with an inside member 30 having four symmetrical projecting lobes 32 which approximately fit into the recesses 26, these lobes being connected by surfaces which approximately fit the arced surfaces of the segments 28. The member 30 is mounted on a crank pin 34 and driven by a shaft 36. The shaft 36 is driven by the engine 18 in the usual manner, to move the pin 34 eccentrically in the ring 22 and cause movement and rotation of the member 30 and the ring 22. At the same time, the lobes 32 alternately move into and out of the pockets 26. The arrangement and operation of the pump is such that as a lobe 32 moves out of a pocket 26, oil is drawn in, and as such a lobe moves inwardly toward such cavity, the oil is driven out. These operations occur regularly on opposite sides of the pump.

Figure 2:
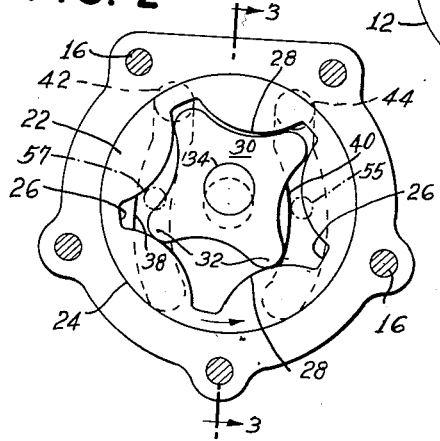
Fig. 2 is a view of the inside face of the mechanism of the pump shown in Fig. 1 with the filter and integral mounting plate removed.
Figure 4:
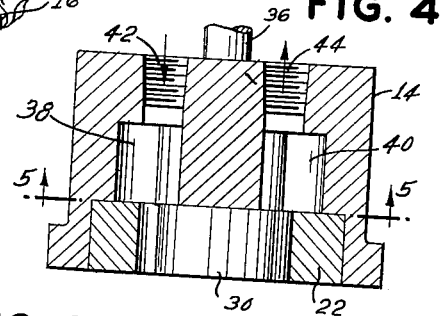
Fig. 4 is a horizontal sectional view of the pump structure shown in Figs. 2 and 3, taken on the line 4—4 of Fig. 3.
Figure 3:
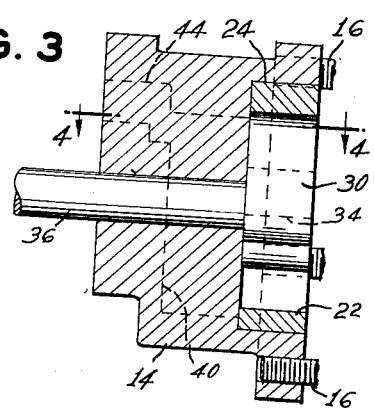
Fig. 3 is a broken vertical cross-sectional view of the pump taken on the line 3—3 of Fig. 2.
Figure 5:
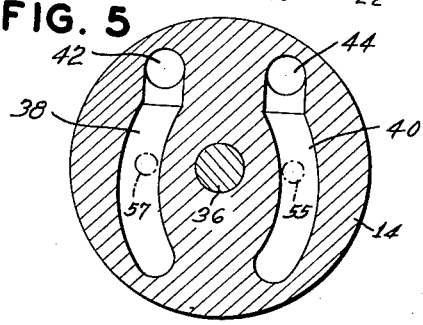
Fig. 5 is a vertical sectional view through the pump structure shown in Figs. 2 to 4, taken on the line 5—5 of Fig. 4.

The normal oil inlet and outlet for the pump are provided in back of the mechanism shown in Fig. 2, as indicated at 38 and 40. As seen in Figs. 4 and 5, the inlet and outlet comprise, respectively, the relatively long arc-shaped pockets 38 and 40 which are recessed in the back wall of the pump body directly in back of the members 22 and 30. The recess or cavity 38 communicates with a threaded inlet duct 42 for the delivery of oil through a pipe or duct, not shown, from the body of oil in the crank case of the engine. The oil delivered by the pump into the cavity or groove 40 is forced through a threaded outlet duct 44 and distributed through ducts or pipes to the various bearings of the engine. All of the connections to the ducts 42 and 44 are entirely inside the engine.

It will be noted from the position of the recesses 38 and 40 in Fig. 2, that as the spaces open up on the left-hand side of the pump, between the members 22 and 30, the oil will be drawn in, and that as these elements rotate to the right-hand side of the pump, the oil will be squeezed out into the recess 40 and forced under the requisite pressure through the duct 44.

The filter body 10 is provided with a standard filter cartridge of more or less conventional type, not shown, but which is mounted around a central tube 46 which carries the filtered oil from the filter cartridge. Cartridges of the type commonly used have an external casing which is perforated so that oil is delivered entirely around the casing and flows through the openings therein, and through the filtering material provided in the cartridge then into the tube 46 which is slotted or perforated. The body 10 is provided with a cover 48 held in place by a bolt 50 and a sealing gasket 52. The bolt 50 is threaded into the upper end of the tube 46 so that the cover is tied down tightly and the filter cartridge held in place.

Oil is supplied to the filter body through a duct 54 which extends through the cast metal of the unit with one end opening, as shown, inside the filter body 10, and the other end opening through the face of the plate 12 with a port 55. It will be noted that the port 55 of the duct 54 opens through the face of the plate 12 on the right side of the pump opposite the outlet cavity 40. The filtered oil is discharged from the filter 10 by a duct 56 which extends through the cast metal of the filter body and opens into the lower portion of the tube 46 and through the face of the plate 12 by a port 57 on the left side of the pump opposite a portion of the oil inlet cavity 38. The pump inlet and outlet cavities or chambers 38 and 40 are on one side of the elements 22 and 30 while the ducts 54 and 56 port on the opposite side of these elements.

While the cavities 38 and 40 are arranged to deliver and receive oil, respectively, over the full range of movement of the pumping members 22 and 30, the ports 55 and 57 of the ducts 54 and 56 at the face of the plate 12 cover a very restricted portion of the face of the pump mechanism. The positions of these ports with respect to the pump mechanism are indicated by the dotted circles in Figs. 2 and 5. In these positions it will be noted that as the ring 22 rotates the segments will partially close the ports or the ducts 54 and 56, and that at other times the lobes or projections 32 will completely close off these ports because the inside surface of the plate 12 bears directly against the surfaces of the ring 22 and of the driven member 30. Ports 55 and 57 therefore cooperate with the movable elements of the pump to meter the oil to and from the filter as each of these ports is alternately opened and closed by the pump rotor mechanism. The filter therefore receives and discharges oil in a quantity which is directly proportional to the speed of rotation or R. P. M. of the pump.

The ports 55 and 57 are in the face of the pump opposite to the long recesses 38 and 40 and are not in index therewith. Since the ports 55 and 57 are alternately closed and opened by the rotor elements 22 and 30, they do not interfere with the normal suction and pressure of the pump but act only in a limited way to meter oil through the filter at a rate depending upon the speed of the pump rotor and the positions of the ports.

In working out the correct positions for the ports 55 and 57 of the particular pump illustrated and described, it was determined that the ports should be spaced apart approximately the width of the narrowest dimension of the eccentrically moving member 30. In this relationship it will be seen that since this member moves eccentrically with respect to the ports, that they will be covered a considerable part of the time by the body of this member. It was found by test that when the ports 55 and 57 are spaced as shown and described, that a sufficient proportion of the oil handled by the pump would be delivered through the filter regardless of the speed of the pump, and that at the same time the rated pressure of the pump would not be materially changed. The ports 55 and 57 may be positioned in accordance with the above procedure to obtain the desired correlation between filter and pump mechanism.

While in describing the invention in connection with the illustrative embodiment reference has been made to a single type of pump cooperating with a filter structure, it will be understood that with other pumps having a similar mechanism or a vane type of rotor, it will be possible to so locate the ports 55 and 57 as to accomplish approximately the results described above. This is particularly true of pumps having a vane driven by an eccentric member. It is to be understood therefore that the invention is not strictly limited to the particular pump described. It is not applicable, however, to pumps such as gear pumps which have characteristic inlet and outlet chambers. Other changes may be made in the structure without materially changing the application, features and objects of the invention, and such changes are contemplated as coming within the spirit and scope of the appended claims.

What I claim as new is:

1. In an apparatus for pumping and filtering oil including an oil pump, and an oil filter mounted on the pump, the improvement which comprises an oil pump having a flat cylindrical pumping chamber, a pair of cooperating pumping elements mounted in and substantially fitted in said chamber from end to end, means for driving said elements, oil supply and oil discharge chambers spaced from each other in the end wall of the pumping chamber behind the pumping elements, an oil filter having a mounting plate attached to said pump and constituting the other end wall of the chamber, said plate overlying the pumping elements and serving to enclose them in the pumping chamber, an oil inlet passageway for the filter for conducting oil from the pumping chamber, said passageway extending in said plate and having a port opening through the inside face of the plate into the pumping chamber at a position opposite a portion of the oil discharge chamber of the pump, and an oil outlet passageway for the filter for conducting filtered oil to the pumping chamber, said outlet passageway extending in said plate and having a port opening into the pumping chamber at a position opposite a portion of the oil supply chamber of the pump, said ports being arranged in said plate with respect to the pumping elements in the pumping chamber so that each port is alternately opened and closed during the operation of the pump.

2. An apparatus for pumping and filtering oil as defined by claim 1 in which said pumping elements comprise an outer ring substantially fitting the inner periphery of the pumping chamber and substantially filling the space between the end wall of the chamber and the plate of the filter, and an eccentrically operated element mounted within said ring, said ring having a plurality of regularly spaced pockets opposite the eccentrically operated element while said eccentrically operated element includes regularly spaced lobes adapted to substantially fit into said pockets.

3. An apparatus for pumping and filtering oil as defined by claim 1 in which said pumping elements include projecting segments, the ports through the plate being arranged with respect to the pumping elements so that they are alternately at least partly opened and closed by the segments of the pumping elements.

4. An apparatus for pumping and filtering oil as defined by claim 1 in which at least one of the pumping elements is arranged to be driven eccentrically in the pumping chamber, and in which the ports opening into the pumping chamber from the filter are arranged in the plate so as to be alternately closed and opened by said eccentrically driven element.

5. In an apparatus for pumping and filtering oil for an engine including an oil pump driven by the engine, and an oil filter mounted on the pump, the improvement which comprises an oil pump having a cylindrical pumping chamber, a pumping element eccentrically mounted in and substantially fitted in said chamber from end to end, means for driving said element, oil supply and oil discharge chambers spaced from each other in the end wall of the pumping chamber behind the pumping element, an oil filter having an integral mounting plate attached to said pump, said plate constituting the other end wall of the pumping chamber and overlying the pumping element and serving to enclose it in the pumping chamber, an oil inlet passageway for the filter for conducting oil from the pumping chamber, said passageway extending in said plate and having a port opening through the inside face of the plate into the pumping chamber at a position opposite a portion of the oil discharge chamber of the pump, and an oil outlet passageway for the filter for conducting filtered oil to the pumping chamber, said outlet passageway extending in said plate and having a port opening into the pumping chamber at a position opposite a portion of the oil supply chamber of the pump, said ports being arranged in said plate with respect to the pumping element in the pumping chamber so that each part is alternately covered and uncovered by the pumping element during the operation of the pump.

6. In an apparatus for pumping and filtering oil including an oil pump, and an oil filter mounted on the pump, the improvement which comprises an oil pump having a cylindrical pumping chamber, a pair of cooperating pumping elements mounted in and substantially fitting against the end walls of the chamber, means for driving said elements, oil supply and oil discharge chambers spaced from each other in the end wall of the pumping chamber beyond the pumping elements, conduits for respectively delivering oil to and conducting oil from said chambers, an oil filter having a mounting plate attached to said pump and constituting the other end wall of the chamber, said plate overlying the pumping elements and serving to enclose them in the pumping chamber, an oil inlet passageway for the filter for conducting oil thereto from the pumping chamber, said passageway extending in said plate and having a port opening into the pumping chamber at a position opposite a portion of the oil discharge chamber to the pump, and an oil outlet passageway from the filter extending in said plate and having a port opening into the pumping chamber at a position opposite a portion of the oil supply chamber of the pump, said ports being of relatively small area compared to that of the oil supply and discharge chambers and arranged in said plate with respect to the pumping elements in the pumping chamber so that each port is alternately covered and uncovered during the operation of the pump.

CECIL PATRICK MOLYNEUX.

No references cited.